(12) United States Patent
Mooneyham

(10) Patent No.: US 8,417,966 B1
(45) Date of Patent: Apr. 9, 2013

(54) SYSTEM AND METHOD FOR MEASURING AND REPORTING CONSUMPTION OF RIGHTS-PROTECTED MEDIA CONTENT

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 381 days.

(21) Appl. No.: 12/796,553

(22) Filed: Jun. 8, 2010

Related U.S. Application Data

(60) Provisional application No. 61/349,722, filed on May 28, 2010.

(51) Int. Cl.
*H04L 9/00* (2006.01)
*G06F 7/04* (2006.01)

(52) U.S. Cl. ........ 713/189; 713/190; 713/191; 713/192; 713/193

(58) Field of Classification Search .................... 713/189
See application file for complete search history.

(56) References Cited

U.S. PATENT DOCUMENTS

| | | | |
|---|---|---|---|
| 5,910,987 A | 6/1999 | Ginter et al. | |
| 6,021,202 A | 2/2000 | Anderson et al. | |
| 6,510,513 B1 | 1/2003 | Danieli | |
| 7,050,583 B2 | 5/2006 | Montgomery | |
| 7,269,735 B2 | 9/2007 | Raley et al. | |
| 7,581,106 B1 | 8/2009 | Das et al. | |
| 2004/0255114 A1* | 12/2004 | Lee et al. | 713/156 |
| 2006/0239451 A1 | 10/2006 | Evans | |
| 2006/0242078 A1 | 10/2006 | Evans | |
| 2006/0242080 A1 | 10/2006 | Van Dyke | |
| 2007/0160208 A1 | 7/2007 | MacLean | |
| 2007/0250901 A1* | 10/2007 | McIntire et al. | 725/146 |
| 2007/0294170 A1 | 12/2007 | Vantalon | |
| 2008/0250100 A1* | 10/2008 | Hatanaka et al. | 709/203 |
| 2009/0169002 A1 | 7/2009 | Hauge | |
| 2009/0259623 A1 | 10/2009 | Mooneyham et al. | |

OTHER PUBLICATIONS

Adobe Systems Incorporated, "Adobe LiveCycle Rights Management ES for CATIA for multiformat design collaboration," Solution Brief, 2008, 4 pages.

* cited by examiner

*Primary Examiner* — Longbit Chai
(74) *Attorney, Agent, or Firm* — Wolfe-SBMC

(57) ABSTRACT

Various embodiments of a system and method for reporting and measuring consumption of media content are described. Embodiments may include computing a set of registration hash values for an encrypted content file representing each of one or more content items. To distribute a content item to a consumer, an encrypted content file representing the content item is delivered to a content viewer system. At the content viewer system, a set of playback sums is computed that corresponds to segments of the content item actually played on the content viewer system. The playback hash values can be matched with registration hash values to establish that one or more segments of a content item associated with the matched hash values have been played.

23 Claims, 7 Drawing Sheets

SYSTEM AND METHOD FOR MEASURING AND REPORTING CONSUMPTION OF RIGHTS-PROTECTED MEDIA CONTENT

This application claims priority to U.S. Provisional Patent Application No. 61/349,722 titled "System and Method for Measuring and Reporting Consumption of Rights-Protected Media Content," inventor Mark Randall Mooneyham, filed May 28, 2010, which is hereby incorporated by reference in its entirety.

BACKGROUND

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining and consuming content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized individuals and/or enforcing other restrictions on the use of such content.

Content providers and advertisers often wish to measure the size, composition, and characteristics of the audience for programming content. For example, an advertiser in a television program may wish to know how many adults in a particular age group viewed a particular episode of a television program.

Traditionally, audience measurement data was collected through the use of surveys, diaries, or other manual reporting approaches. For example, in early implementations of the well-known Nielsen ratings for television audience measurement, viewers self-reported their viewing choices in written diaries. More recently, devices such as set meters have been used to automate some aspects of tracking the viewing habits of audiences.

When content to be measured is delivered in an unencrypted form, such as in an analog signal sent over a coaxial cable, it is a relatively simple matter to tap into the signal to monitor what a viewer is consuming. As noted above, however, in network settings such as the Internet, content providers often implement measures such as DRM to limit access to the content to authorized users only. In cases in which the files carrying the content are encrypted, a measuring entity may not be able to determine what content is being consumed by a viewer. One solution to this problem is to distribute to the measurement entities the keys for decrypting the content files. Such distribution may, however, create opportunities for unauthorized use and distribution of the content (if, for example, a hacker were to gain access to keys maintained by a measurement entity.)

Another approach to enable a measurement of encrypted content is through the use of content identification markers attached to encrypted files. For example, an identification tag may be placed in a metadata header of an encrypted content file. Such identification markers may, however, be susceptible to alteration, misuse, or error. For example, a program identifier meta-tag for one program might be substituted (either intentionally or unintentionally) with the program identifier meta-tag of a second program, thereby overstating the playbacks for the second program.

SUMMARY

Various embodiments of a system and method for reporting and measuring consumption of media content are described. Various embodiments relate to consumption of media distributed in encrypted form, for example, using a DRM framework. Various embodiments may include computer-implemented methods as well as elements configured to perform such methods. In one embodiment, a computer-implemented method of reporting consumption of media content includes computing a set of registration hash values for an encrypted content file representing each of one or more content items (such as a video, song, or television program). The set of registration hash values for each content item may be computed by applying a hash function to blocks of data of the encrypted content file for the content item. Each of the blocks of data may correspond to a segment of the content item. The sets of registration hash values associated with the content items may be provided to a measurement entity. To distribute a content item to a consumer, an encrypted content file representing the content item is delivered to a content viewer system. At the content viewer system, a set of playback sums is computed for the content item by applying the hash function to the blocks of data of the delivered encrypted content file that correspond to segments of the content item actually played on the content viewer system. The playback hash values are reported to the measurement entity. The playback hash values can be matched by the measurement entity with registration hash values provided to the measurement entity to establish that one or more segments of the content item associated with the matched hash values have been played. In some embodiments, a content ID for the content item is associated with the encrypted content file for the content item and/or the sets of hash values for the content item. The content ID may be used to identify which content item has been played.

In one embodiment, a computer-implemented method of measuring consumption of media content includes receiving (for example, by a measurement entity) one or more sets of registration hash values. The sets of registrations hash values may be computed by applying a hash function to an encrypted content file representing each of one or more content items. Each of the sets of registration hash values may correspond to a different content item. When a content item is played back on a content viewer system, a set of playback hash values is computed for the portions of the content item actually played on the content viewer system. The playback hash values in the set may be computed by applying the hash function to the encrypted content file for the content item delivered to the content viewer system. One or more matches may be determined between the playback hash values computed from the encrypted content files delivered to the content viewer system and the registration hash values. Segment of the content items that have been played on the content viewer system are determined based on the matches between the registration hash values and the playback hash values.

Figure 1:
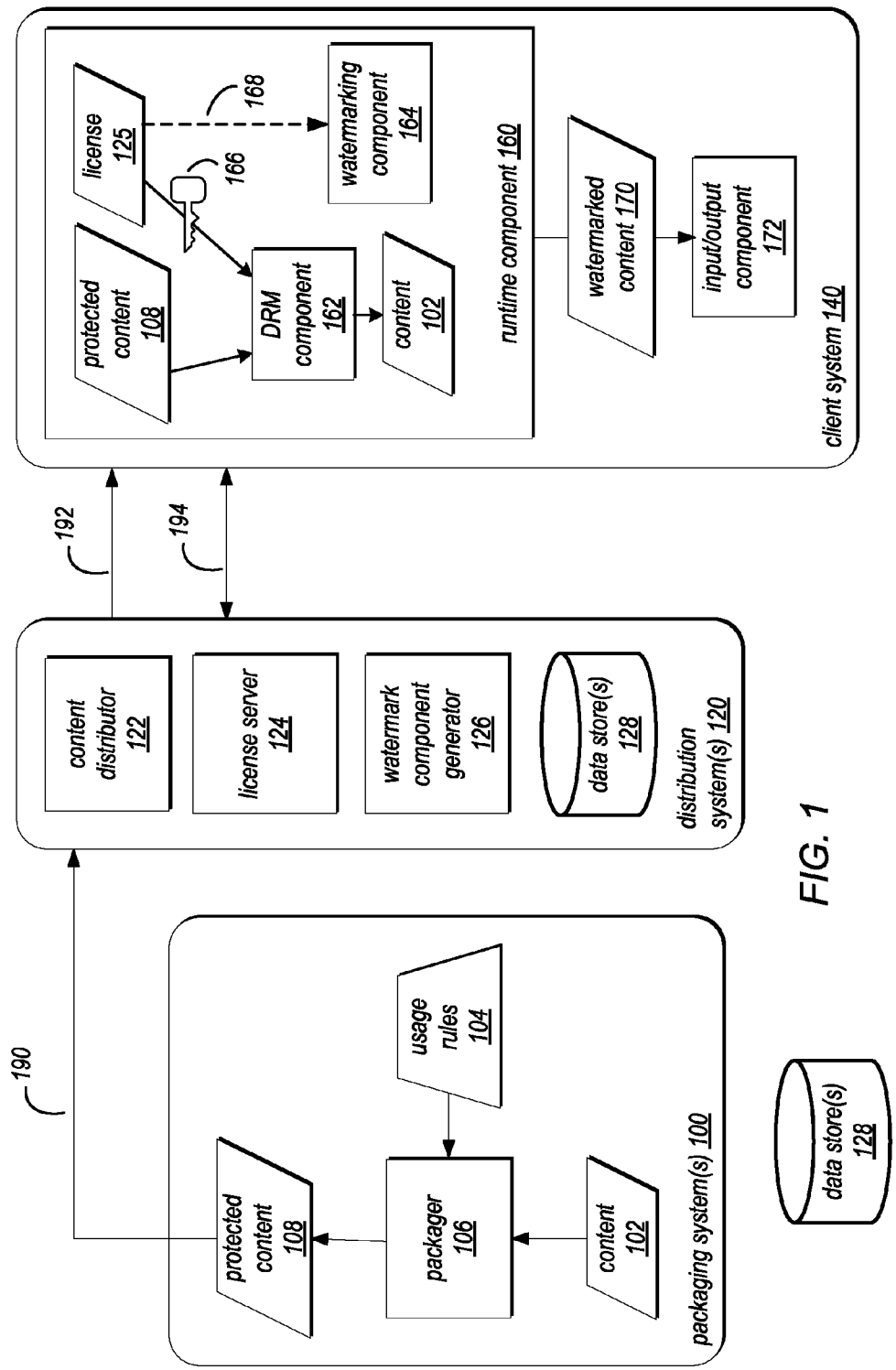
FIG. 1 illustrates a block diagram of the various elements of a system and method for delivering content, according to various embodiments.

While the system and method for reporting and measuring consumption of media content is described herein by way of example for several embodiments and illustrative drawings, those skilled in the art will recognize that the system and method for reporting and measuring consumption of media content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for reporting and measuring consumption of media content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Introduction

Various embodiments of a system and method for measurement of consumption of media content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments may include a distribution system configured to provide protected content (e.g., encrypted content) to one or more client systems. For example, a distribution system may serve web-based content, such as video content (or any other type of content described herein), to multiple client systems. In various embodiments, the distribution system may also provide a client with a digital watermarking component. Note that in various embodiments the distribution system that provides the watermarking component to a client may be but need not be the same distribution system that provides that client with the protected content. The watermarking component, when executed on the client system, may add a digital watermark to the content. An example of such a watermarking component includes but is not limited to a filter (e.g., executable logic or instructions) of the Adobe® Pixel Bender™ infrastructure.

Various embodiments include various encryption and/or decryption keys, any of which may be generated via a key derivation function (KDF). Key derivation functions may include one or more iterations or instances of hash functions and/or other cryptographic operations in order to generate an encryption or decryption key. Examples of key derivation function may include but are not limited to any key derivation functions specified by Public Key Cryptography Standards (PKCS) (e.g., PKCS-5) or Adobe Password Security.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "content item(s)," "content data," "content information" or simply "data" or "information"). In general, content may include any information or data that may be licensed to one or more individuals (or other entities, such as business or group). A "content item" includes any item of information that can be viewed, listened to, or otherwise perceived by a person. A content item may be or include video, audio, still images, or any combination thereof. In various embodiments, content may include electronic representations of video, audio, text and/or graphics, which may include but is not limited to electronic representations of videos, movies, or other multimedia, which may include but is not limited to data files adhering to Adobe® Flash® Video (.FLV or .F4V) format or some other video file format whether such format is presently known or developed in the future. Examples of content items may include a television episode, a song, a film, a music video, a news report, a video interview, a photograph, a graphical image, a podcast, a document, or an audio book. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

As used herein, a "hash value" is a value computed from a block of data or portion of a file by applying a function to the block of data or the portion of the file. Any of various functions may be used to compute a hash value, including perfect hash, rolling hash, or universal hash. In certain embodiments, a hash value may be computed using a checksum function, such as a parity byte or modular sum. A hash value does not require that a conventional sum (adding two values to one another) be computed, however. A hash value may be used for any purpose, including playback measurement, content identification, or error checking.

As used herein, a "registration hash value" is a value computed from a block of data, or a portion of a file, that can be stored and later used to identify, recognize, or track the block of data or the portion of the file, or to identify, recognize, or track a segment or portion of a content item associated with the block of data or portion of the file. As used herein, "registration" means recording a value for later use, such as for measurement, identification, or tracking of a file, a content item, or a portion thereof. For example, a registration hash value may be determined for a segment of a content item prior to distribution of the content item.

As used herein, a "playback hash value" is a value computed from a block of data corresponding to a segment or portion of a content item that is played.

As used herein, to "playback", as applied to content, means to play, generate, display, or reproduce previously recorded content.

As used herein, a "block" of data includes a block, chunk, string, or portion of data.

As used herein, "view" means to view, watch, listen to, examine, read, or otherwise consume. As used herein, a "content viewer" includes any device that can be used to view content.

As used herein, a "set" means a set, group, or collection of one or more items.

In various instances, this detailed disclosure may refer to consuming content or to the consumption of content, which may include accessing content, displaying content for view (e.g., for view by a user), playing content (e.g., in a media player), or rendering content (e.g., rendering 2D or 3D images) among other things. In some cases, the particular term utilized may be dependent on the context in which it is used. For example, consuming video may also be referred to as displaying or playing the video.

In various instances, this detailed description may refer to a device on which content may be consumed. In various embodiments, such a device may include but is not limited to a computing system (e.g., a desktop or laptop computer or other type of computer system), a digital audio or multimedia player (e.g., an MP3 player), a personal digital assistant (PDA), a mobile phone, a smartphone, an e-book reader, a digital photo frame, a television, a set top box (which may be used in conjunction with televisions or other monitors), a hand held or mobile device, or any other electronic device or system configured to access, view, read, write, and/or manipulate any of the content data described herein. Any of such devices may be implemented via a computer system similar to that described with respect to FIG. 7.

Note that in various instances the description presented herein may refer to a given entity performing some action. It should be understood that this language may in some cases mean that a system (e.g., a computer system) owned and/or controlled by the given entity is actually performing the action.

In various embodiments, various techniques may be utilized to provide secure communication between any of the elements of the DRM framework described herein. For instance, various elements of the DRM framework may be associated with respected public key—private key pairs, such as key pairs utilized in Public Key Infrastructure (PKI). In various embodiments, a first element (e.g., a content distribution system) may securely transfer data (e.g., a content license) to a second element by encrypting that data with the second element's public key. In this manner, only the second element will be able to decrypt the encrypted data to access the unencrypted data, according to various embodiments. For instance, since in various embodiments knowledge of a private key may be required to decrypt data and since the second element may be the only element that has knowledge of its own private key, the second element may be the only element able to decrypt the data with the correct private key. Note that the aforesaid techniques may in various embodiments be utilized for any transfer of data within the DRM framework described herein.

In various embodiments, a content item may include one or more digital watermarks. A digital watermark may be a visible watermark or an invisible watermark. Visible watermarks may include graphics, text, images, icons, or other graphical elements that are superimposed onto frames of video content, individual photographs, or graphical content. In some cases, visible watermarks may be at least partially translucent so as to allow a partial view of the content "behind" the watermark. In various embodiments, visible watermarks may indicate a particular type of information, such as a name and/or an identifier. For instance, a visible watermark may indicate the name of an individual authorized to view the content to which the visible watermark is applied. Other types of visible watermarks are described in more detail herein. Visible watermarks may deter various types of unauthorized distribution. For example, if a video file is watermarked with the name of a customer that purchased the video file (or other information that identifies the customer or can be traced back to the customer), the customer may be less likely to share the video file with unauthorized users. For instance, the customer may be less likely to upload the video file to a website or a peer-to-peer file sharing network due to fear of having such file (and thus the unauthorized sharing of the file) traced back to him. Invisible watermarks may include any type of information embedded into content that is not human-perceptible absent some additional analysis performed by a computer system. While invisible watermarks may not be human-perceptible, computer-implemented logic may detect or retrieve an invisible watermark from watermarked content. Such logic is sometimes referred to as a watermark detection function or a watermark retrieval function. In some embodiments, applying a watermark may include applying both a visible watermark and an invisible watermark.

In various embodiments, the logic of the watermarking component sent to the client and/or the runtime component on the client system may ensure that the content cannot be accessed without a digital watermark applied to the content. In an example where the content is video content, the watermarking component and/or the runtime component may allow the video content to be played if and only if a watermark is superimposed on at least some of the frames of the video content. Other examples of ensuring that content cannot be accessed without a digital watermark applied to the content are described in more detail herein.

Packaging

FIG. 1 illustrates various components of the system and method for digital rights management. Packaging system(s) 100 may be implemented via one or more computer systems. In various embodiments, packaging system(s) 100 may be owned or controlled by a content owner or rights holder, an example of which includes an entity that owns rights to such content (e.g., copyrights or other intellectual property rights). In one particular example, a content owner may provide such content to other entities (e.g., content merchants or distributors) in exchange for licensing fees. For instance, such a content owner might produce content (e.g., a film) and license such content to a content merchant (e.g., an online merchant that sells or rents content online) that distributes the content to retail customers.

In various embodiments, packager 106 may be configured to package content 102 with usage rules 104 in order to generate protected content 108. Protecting or packaging content 102 may in some embodiments include encrypting the content with an encryption key. In some cases, this may also include encrypting usage rules 104 along with content 102 to generate protected content that includes such usage rules. In this case, if the protected content is eventually decrypted, the decrypted usage rules can be enforced on the usage of the content. In general, usage rules may include any restrictions on the use or access of the content including but not limited to restricting the access of content to a particular time period, restricting the actions (e.g., view, copy, save, distribute, etc.) that can be performed with respect to the protected content. In some cases, usage rules packaged together with content 102 may serve as a template to be populated with one or more rules by another entity (e.g., a content distributor that sells or rents the content). For instance, a content distributor may specify within such template a rule that indicates an expiration date for the content. As an alternative to storing usage rules within protected content (or in addition to storing usage rules within the protected content), usage rules may be stored within a content license for the content (described in more detail below). Storing the usage rules within the content license may facilitate creating user-specific usage rules for the same protected content; for instance, different licenses containing different usage rules can be created for different users.

Distribution

In various embodiments, packaging system(s) 100 may provide different types of protected content, such as protected content 108, to one or more distribution system(s) 120, as illustrated by communication 190. In various embodiments, distribution system(s) 120 may request such content. In other cases, packaging system(s) 100 may automatically deliver such content to distribution system(s) 120 (e.g., in a "push" manner). The various instances of protected content received by distribution systems 120 may be stored within data store 128 such that the content is accessible to other elements of the distribution system. In various embodiments, data store 128 may be configured as a database, as one or more mass storage devices (e.g., physical disks, logical volumes, etc.) configured to store data blocks or files, or in any other suitable configuration for data storage. In various embodiments, data store 128 may store protected content 108 as well as multiple other portions of protected content.

Content distributor 122 may be configured to provide protected content to one or more clients, such as client 140. For instance, content distributor 122 may be a component of a web server (or other network-based server) that serves content to various clients. For example, a runtime component 160 may be part of a web browser or operate in conjunction with a web browser to issue a request for content from distribution system(s) 120. Distribution systems 120 may provide content to one or more clients, such as client 140, in response to such a request. In the illustrated embodiment, distribution system (s) 120 may provide protected content 108 (or other types of protected content) to client 140, as illustrated by communication 192. In various embodiments, runtime component may be a computer-implemented runtime environment in which various applications, programs, functions, scripts, bytecodes and/or other instructions may be executed. In one particular example, runtime component 100 may be Adobe® Flash® Player.

In various embodiments, as illustrated by communication (s) 194, runtime component 160 may issue a request for a content license for protected content 108. Such communication may also include runtime component 160 and license server 124 performing an authentication process in order to establish that client 140 (and/or a user of client 140) is authorized to receive a content license. In various embodiments, protected content cannot be consumed (e.g., presented, played, displayed, rendered, etc.) until a clear form of the content has been generated. For instance, if protected content 108 is encrypted (which may be the case), the protected content must be decrypted in order to access the unencrypted version of the content (e.g., content 102). In various embodiments, the aforesaid content license may include a content key that may be utilized to decrypt protected content 108. In other words, protected content 108 may not be consumed without obtaining the appropriate license for that content in various embodiments. As such, license server 124 may only provide a content license for protected content 108 to authorized clients (or authorized users operating such client machines).

Various types of information may be exchanged during communication(s) 194 in order to carry out the authentication process. In some embodiments, runtime component 160 may provide a username and password associated with a customer account and/or a content purchase. License server 124 may verify such information by comparing it to information (e.g., customer records, customer profiles, purchase records, etc.) within data store(s) 120. In some cases, runtime component 160 may provide a digital credential (e.g., a digital certificate issued by a trusted third party) as part of the authentication process, one example of which includes an X.509 digital certificate. In other cases, other types of digital credentials may be sent from the runtime component 160 to license server 124, time-based codes, biometric information, or other verifiable information to establish the identity of client system 140 (or a user controlling such system). In various embodiments, information identifying runtime component 160 (e.g., a version or instance identifier), client system 140 (e.g., a machine address or internet protocol address), or other elements of client system 140 may be provided to license server 124 during communication(s) 194.

If the license server 124 does not positively verify the information provided by the client system, the license server may withhold the content license that corresponds to protected content 108 from the client system. If the license server 124 does positively verify (e.g., by comparing the information provided to information on record in data store 128), the license server may send content license 125 (which may include the correct content key for decrypting protected content 108) to runtime component 160. In some cases, a content license may also be referred to as a content policy.

License 125 may include the content key for decrypting protected content 108 (which may in many cases, but not necessarily all cases, be specific to that content). License 125 may also include one or more usage rules (which may also be referred to as policy rules). In general, usage rules may include any restrictions on the use or access of the content including but not limited to restricting the access of content to a particular time period, restricting the actions (e.g., view, copy, save, distribute, etc.) that can be performed with respect to the protected content. In various embodiments, usage rules may specify whether a watermark is to be applied to protected content 108 prior to consumption of that content. In the illustrated embodiment, license 125 may specify that protected content 108 may only be consumed with a watermark applied to that content. In various embodiments, license 125 may specify the particular watermarking component (described in more detail below) that is to be utilized to apply such a watermark.

In various embodiments, distribution system 120 may also provide a watermarking component 164 to runtime component 160. In various embodiments, this watermarking component is not present on client system 140 prior to receiving such watermarking component from the distribution system. In some cases, such as in the illustrated embodiment, the watermarking component 164 may be delivered to runtime component 160 as part of content license 125 (e.g., watermarking component 164 is included within content license 125). Runtime component 160 may be configured to extract runtime component 164 from content license 125 in various embodiments, as illustrated at 168. In embodiments, where the watermarking component 164 is an element of the content license 125, the authentication process described with respect to 194 may serve as an authentication process for the content license as well as the watermarking component 164 (by virtue of the watermark components inclusion within the license). In embodiments where the watermarking component 164 is an element distinct from the content license, either the authentication process described with respect to communications 194 or a separate similar authentication process may be utilized to control access to the watermarking component.

In various embodiments, the watermarking component(s) provided by distribution system(s) 120 to client system 140 may be generated by watermark component generator 126. For instance, in embodiments where license server inserts a watermarking component into license 125, the license server may query watermark component generator 126 for data representing such watermark component. In various embodiments, such data may include executable instructions (which may be represented by bytecode) configured to apply a watermark to a portion of content. Watermark component generator 126 may be configured to provide the license server with watermark components for inclusion within a content license and delivery to a client system. In embodiments where the watermarking component(s) provided by distribution system(s) 120 are provided to client systems separately from content licenses, the watermark component generator 126 may provide such watermarking component(s) to such client systems.

As described above, the watermarking component described herein may in some embodiments include executable instructions, such as bytecode. Runtime component 160 may in various embodiments execute such instructions to apply a watermark to content. In some embodiments, runtime component may implement a virtual machine configured to execute the watermarking component. For instance, in embodiments where the watermarking component is represented by executable bytecode, the runtime component described herein may be configured to utilize the aforesaid virtual machine to execute the bytecode. In one example, the runtime component described herein may implement a virtual machine adhering to the Adobe® Pixel Bender™ infrastructure and the watermarking component may be a filter adhering to the Adobe® Pixel Bender™ infrastructure; such a filter may be represented by bytecode that may be executed by the aforesaid virtual machine in order to apply a watermark to content.

In various embodiments, runtime component 160 may include a digital rights management (DRM) component 162. One particular example of DRM component 162 includes Adobe® DRM Client for Flash® Player. In various embodiments, DRM component 162 may be configured to extract a content key 166 from license 125 and decrypt protected content 108 with such key. In the illustrated embodiment, the result of such decryption is illustrated as content 102, which may be the same as the content 102 originally packaged at packaging system(s) 100. In various embodiments, DRM component 162 may be configured to perform encryption/decryption according to various techniques including but not limited to symmetric encryption/decryption and asymmetric encryption/decryption.

Example Network with Measurement System

Figure 2:
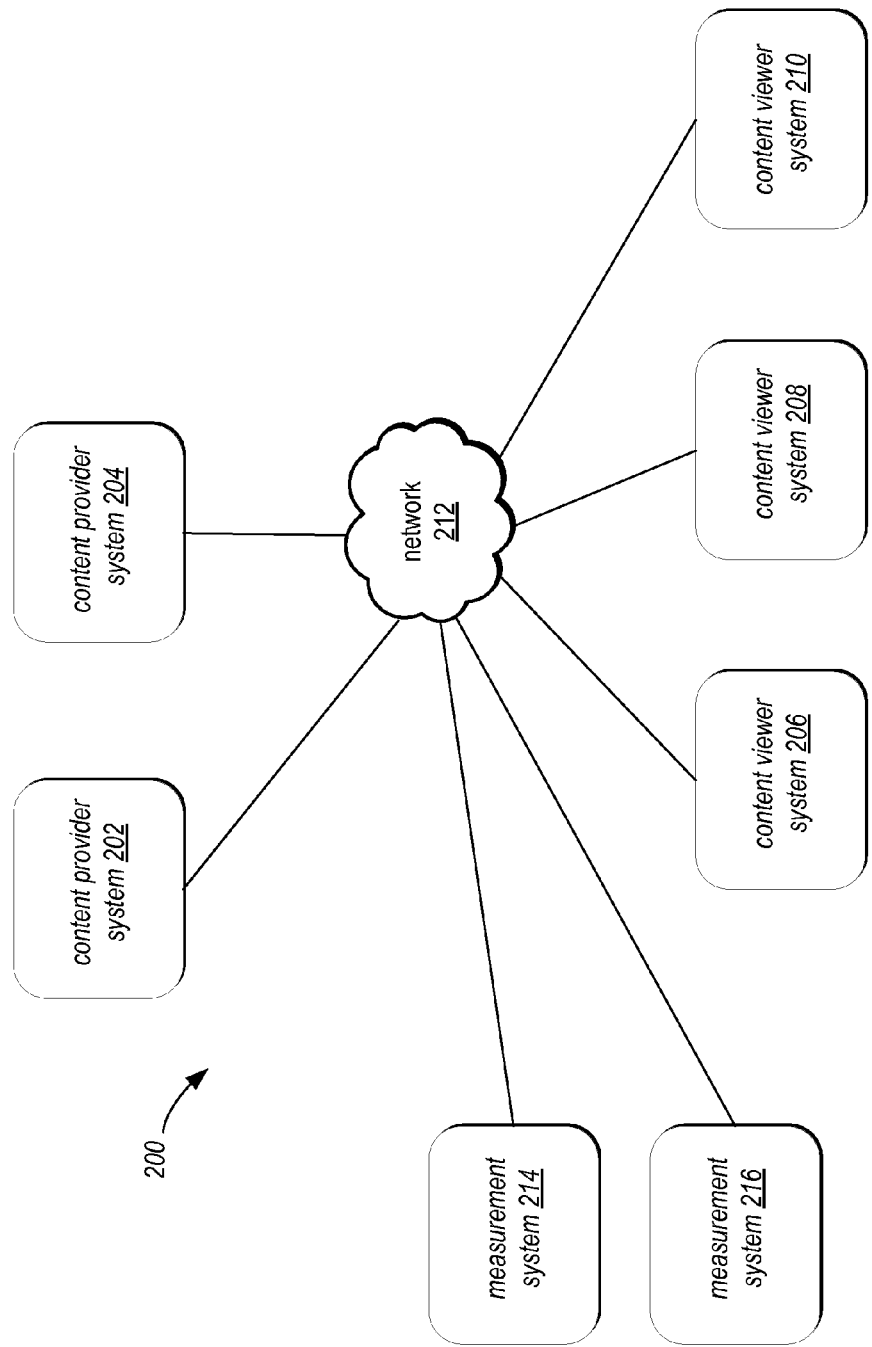
FIG. 2 illustrates one example system configuration, which may be utilized in various embodiments.

FIG. 2 illustrates one example system configuration, which may be utilized in various embodiments. In the illustrated embodiment, system 200 includes content provider system 202, content provider system 204, content viewer system 206, content viewer system 208, and content viewer system 210. Content provider system 202, content provider system 204, content viewer system 206, content viewer system 208, and content viewer system 210 are coupled to network 212. Content provider system 202 and content provider system 204 may provide content to content viewer system 206, content viewer system 208, and/or content viewer system 210 over network 212.

In the illustrated embodiment, each system may be configured to communicate to any other system via network 212. Network 212 may be a variety of one or more networks including but not limited to Local Area Networks (LANs), Wide Area Networks (WANs), telecommunication networks (e.g., mobile voice and data networks), some other type of network, or some combination thereof. In the illustrated embodiment, any of the content provider systems may be configured as described above with respect to distribution system(s) 120, packaging system(s) 100, or any combination thereof. Any of the illustrated content viewer systems may be configured as client system 140 described above.

Measurement system 214 and measurement system 216 are coupled to network 212. Measurement systems 214 and 216 may communicate with any of the content provider systems and content viewer systems over network 212. Measurement system 214 and measurement system 216 may measure content delivered from content provider system 202 or content provider system 204 to any of content viewer system 206, content viewer system 208, or content viewer system 210.

Figure 3:
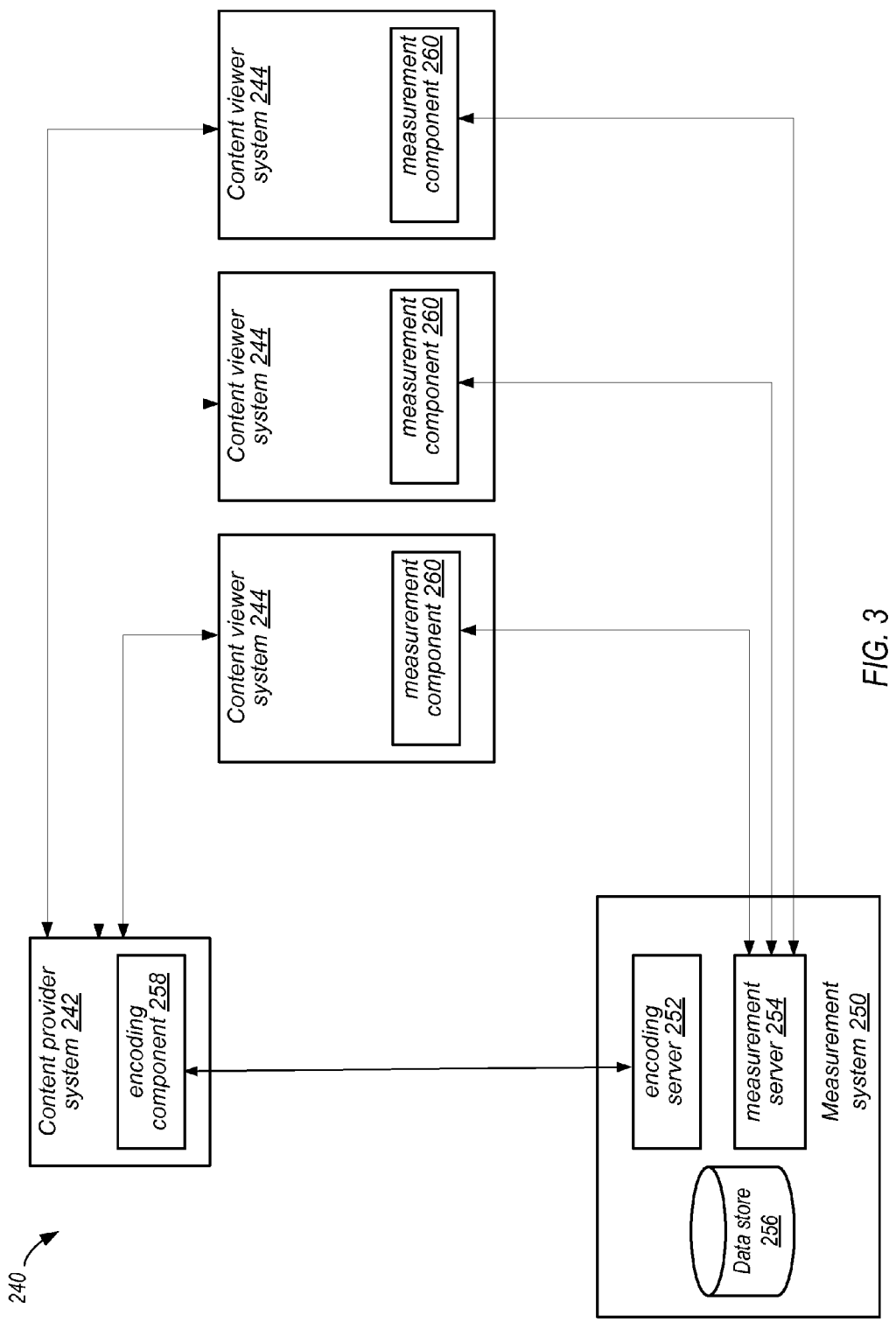
FIG. 3 is a block diagram illustrating one embodiment of a system including a system for measuring content consumption.

FIG. 3 is a block diagram illustrating one embodiment of a system including a system for measuring content consumption. System 240 includes content provider system 242, content viewer systems 244, and measurement system 250. Measurement system 250 includes encoding server 252, measurement server 254, and data store 256.

Content provider system 242 includes encoding component 258. Encoding component 258 may interact with encoding server 252. In some embodiments, encoding component 258 or encoding server 252 may encrypt content to be distributed from content provider system 242. In some embodiments, encoding component 258 or encoding server 252 may compute verification data, such as hash values, of encrypted content files to be distributed from content provider system 242 to content viewer systems 244. In certain embodiments, encoding component 258 may exchange content identification codes relating to content items distributed from content provider system 242. Hash values and content identification codes associated with files to be distributed from content provider system 242 may be stored on data store 256 of measurement system 250.

Content viewer systems 244 include measurement components 260. Measurement components 260 may interact with measurement server 254 of measurement system 250. Measurement server 254 may collect data from measurement components 260 relating to content played on content viewer systems 244. In some embodiments, measurement component 260 may compute hash values of encrypted content files distributed to content viewer systems 244 from content provider system 242. Hash values and content identification codes associated with files received from content provider system 242 may be stored on data store 256 of measurement system 250. In various embodiments, measurement system 250 may compare hash values received from measurement components 260 of content viewer systems 244 with hash values received from content provider system 242.

Although in the embodiment illustrated in FIG. 3, each of content viewer systems 244 includes one of measurement components 260, in various embodiments, a measurement component may be included on only some of the content viewer systems on a network. In some embodiments, consumption of content may be measured on only a representative sample of the content viewer systems on a network. A sample may be selected, for example, to adequately measure various demographic groups that receive the media content from a content provider. In addition, a measurement entity may activate or collect data from only a subset of the content viewer systems that have measurement components installed.

In various embodiments, a measurement system, such as measurement system 250, may be operated by a measurement entity. The measurement entity may be, for example, a company that provides measurement data to content providers and advertisers.

Example Methods

Figure 8:
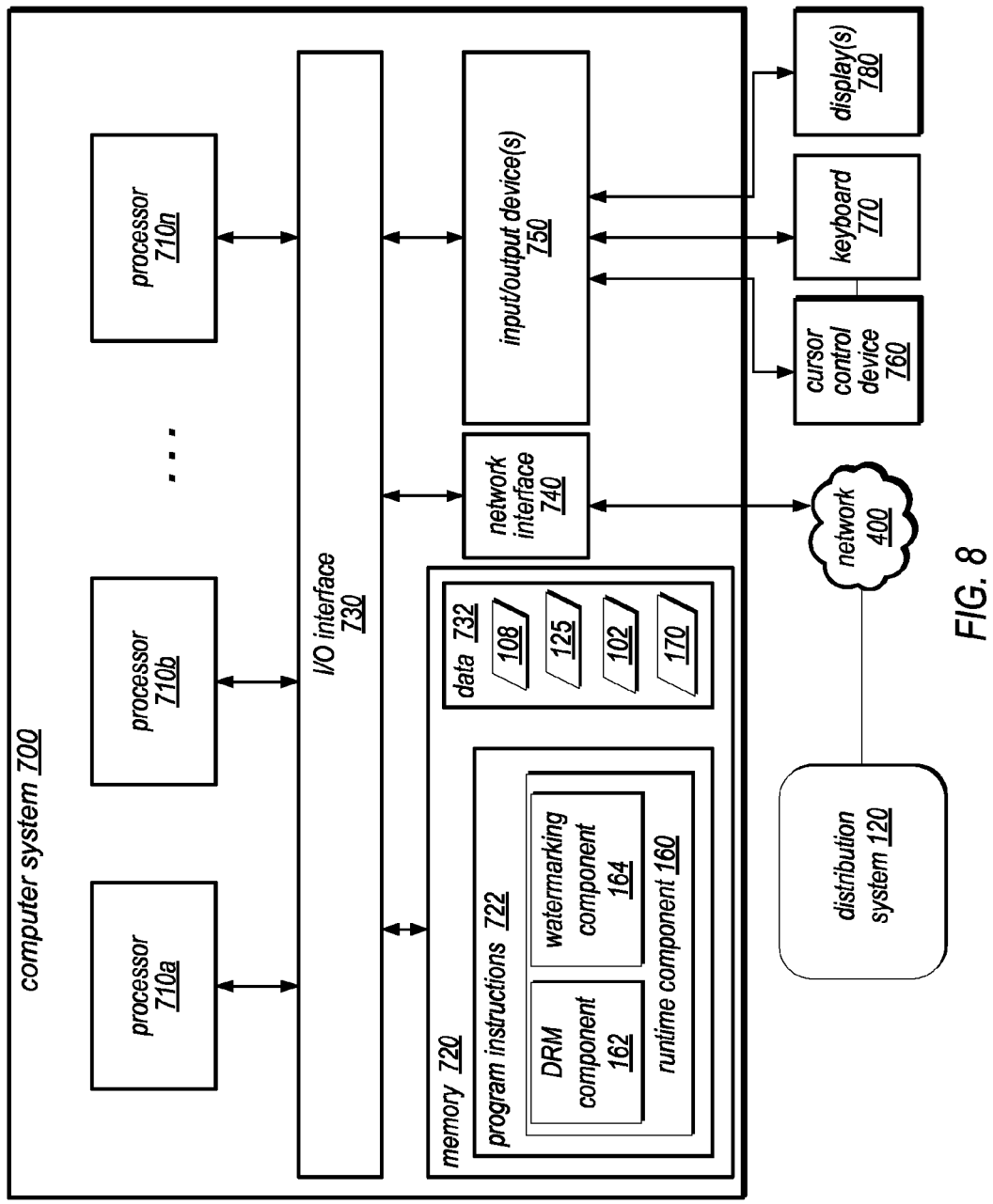
FIG. 8 illustrates an example computer system configured to implement various elements of the system and method for delivering content and measuring consumption of the content.

The system and method for measuring consumption of media content may include various methods, some of which are described below with respect to FIG. 4. In various embodiments, the methods illustrated may be performed by the computer system of FIG. 8 described below.

In some embodiments, a set of hash values is computed from an encrypted content file representing a content item. Each checksum in the set may correspond to a block of data in the encrypted content file. Each block of data may correspond to a segment of the content item (for example, the first 15 seconds of a television program). Thus, for example, the first hash value in a hash value set for a television program may correspond to the first 15 seconds of the program, the second hash value in the set for the content item may correspond to the second 15 seconds of the program, etc. The hash values may be computed using any suitable function.

In some embodiments, a set of hash values is computed from an encrypted content file representing a content item before the encrypted content file is distributed to consumers. A second set of hash values may be computed from the encrypted content file after the content item is distributed, for example, when the content item is played back to a consumer. A match in the values of the hash values computed before distribution with the values of the hash values upon playback can be used to verify that the content item was actually played to the consumer.

In some embodiments, a set of registration hash values is computed from encrypted content files for each of various content items to be distributed by a content provider. For example, one set of registration hash values may be computed from an encrypted content file representing Episode #1 of Law and Order, another set of registration hash values may be computed from an encrypted content file representing Episode #2 of Law and Order, still another set of registration hash values may be computed from an encrypted content file representing Episode #40 of Gunsmoke, etc. When an encrypted file representing one of the content items is distributed and played back to a consumer, a second set of hash values may be computed from the distributed encrypted content file using the same function used to compute the registration hash values. The set of playback hash values can be compared to one or more of the sets of registration hash values to establish which, if any, of the content items distributed by the content provider were played to the consumer. Matching hash values computed from encrypted content files may allow measurement of content consumption without the need for a measurement entity to access to unencrypted content data. In certain embodiments, a measurement system may measure consumption of content from two or more content providers.

In some embodiments, a content ID for a content item is associated with the set of hash values and distributed with the encrypted content file (for example, in metadata). The content ID may be used to assist in matching a set of playback hash values with the appropriate set of registration hash values.

Figure 4:
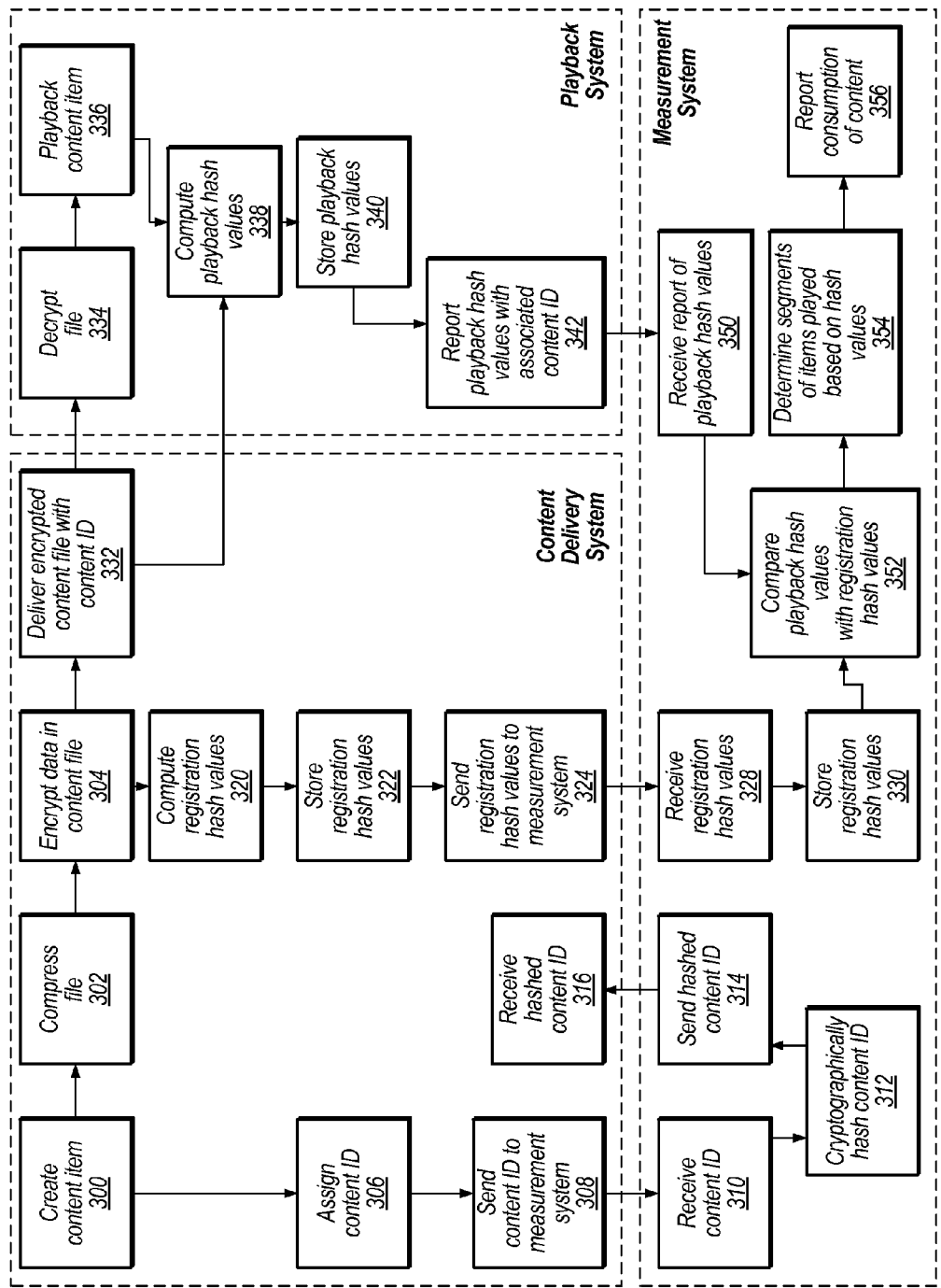
FIG. 4 illustrates a one example of a system configuration for providing content and measuring consumption of the content, according to various embodiments.

FIG. 4 illustrates distribution of media content and measurement of consumption of the content using hash values according to one embodiment. At 300, a content item is created. Creation of the content item may be accomplished, for example, as described above relative to FIG. 1. In some embodiments, a content item may be created (in whole or in part) at a location outside of a content delivery system (such as in a studio) and provided to a content delivery system.

At 302, a file representing the content item is compressed. At 304, a data file is encrypted for the content item. In certain embodiments, file compression and encryption are accomplished in a single step. In some embodiments, a content item is encrypted using a DRM component, such as DRM component 162 described above relative to FIG. 1.

In various embodiments, a content identifier ("content ID") is established for a content item. In FIG. 4, for example, a content ID is assigned for the content item at 306. The content ID may be a unique to the content item. In some embodiments, a content provider generates or selects the content ID. In other embodiments, a measurement entity may generate a content ID for a content item. In the embodiment illustrated in FIG. 4, the content ID is sent from the content provider system to the measurement system at 308 and received by the measurement system at 410.

At 312, the content ID assigned in 306 is cryptographically hashed. Cryptographic hashing may be accomplished using any cryptographic hash function. The cryptographically hashed content ID is sent from the measurement system back to the content delivery system at 314 and received by the content provider system at 316. The cryptographically hashed content ID may be a unique code for the content item. As between the content provider and the measurement entity, the cryptographically hashed content ID may serve as an agreed upon identifier for the content item that has been encrypted at 304. The cryptographically hashed content ID may be associated with the encrypted content file.

At 320, a set of registration hash values is computed from the encrypted content file for the content item. In certain embodiments, registrations hash values are computed as a content item is encrypted. Each hash value may be computed by applying a function to a block of data of the encrypted content file. For example, the hash values may be computed for chunks of data of the encrypted content file corresponding to a fixed time segment, or a fixed block size. Examples of segment lengths for hash values include 5 seconds, 10 seconds, 15 seconds, or 30 seconds. In certain embodiments, hash values can be computed for a content item based on segments of non-uniform length. For example, the first 10 hash values in a set may be computed from blocks of data that correspond to 6 second segments, while the remaining hash values may be computed from blocks of data that correspond to 12 second segments.

In some embodiments, each of the hash values may be unique relative to the other hash values in the set for the content item. In some embodiments, each of the hash values may be unique relative to the hash values for any content items. In certain embodiments, however, there may be collisions in values (identical values) between hash values among content items being measured, or within a given content item. For example, the third hash value in Episode #1 of Law and Order might have the same value as the tenth hash value in Episode #40 of Gunsmoke.

At 322, the set of registration hash values for the content item may be stored, for example, in a memory in a content delivery system. At 324, registration hash values may be sent to measurement entity. Registration hash values may be sent, for example, over a network such as the Internet. In some embodiments, sets of registration hash values for content items are stored and then submitted to a measurement system in batches (for example, all of the content items added to a content server in a particular day). In other embodiments, the set of hash values for each content item may be sent to a measurement as it is computed.

At 328, the set of registration hash values for the content item is received in the measurement system. At 330, the set of registration hash values is stored in the measurement system.

At 332, the encrypted content file for the content item is delivered to a consumer at a playback system. Although only one playback system is shown in FIG. 4 for clarity, the content item may be delivered to any number of consumers at any number of playback systems. A content ID for the content item may be sent with the encrypted content file. In some embodiments, the content ID is included in metadata. For example, the content ID may be included in a metadata header attached to the encrypted content file. In some embodiments, the content ID attached to the distributed content file may be the content ID that was assigned by the content provider at 306. In other embodiments, the content ID may be the cryptographically hashed content ID that was computed in the measurement system and received in the content delivery system at 324. In certain embodiments, a measurement flag is distributed with in addition to, or instead of, a content ID for the content item. The measurement flag may serve as a trigger that consumption of the content item in the playback system is to be measured and/or reported. In some embodiments, the measurement flag may be used as a trigger to initiate computation of playback hash values from the encrypted content file.

At 334, the encrypted content file for the content item may be decrypted. At 336, the content item may be played back to a consumer.

At 338, playback hash values may be computed for blocks of data of the encrypted content file that correspond to the segments of content item. In various embodiments, the hash function used to compute the set of playback hash values is the same as the hash function that was previously used to the compute the set of registration hash values for the content item. In addition, the hash function may be applied to the same size blocks of data as were used to compute the registration hash values. In some embodiments, playback sums are computed based on code for playback device. In other embodiments, playback hash values are computed in separately installed measurement client, such as measurement component 260 described above relative to FIG. 3. In some embodiments, playback hash values are computed in secure portion of a playback system. Thus, the code to compute the playback sums may be isolated from code in unsecure portions of a playback system.

In some embodiments, the hash value for each block of data is computed only if the segment of the content item corresponding to the block of data is actually played back on the playback system. For example, if the first 5 segments of a 60-segment content item are played back and then playback is terminated without playing the last 55 segments, playback hash values may be computed and reported only for the first 5 segments. Thus, the reported hash values may give an accurate report of a partial viewing of a content item.

In some embodiments, a hash value is computed and reported only if the entire segment corresponding block of data is played back. In other embodiments, a playback hash value is computed and reported if any portion of the segment corresponding to the block of data is played back.

In certain embodiments, playback hash values may be computed and/or reported to reflect intermittent play or disjunctive play. For example, if a viewer plays back the first 10 segments of a 60-segment television episode and then skips or fast-forwards to the last 10 segments, hash values may not be computed or reported for the skipped 40 middle segments. In certain embodiments, playback hash values may be computed and reported to account for repeated playback of segment (such as where a user rewinds to watch a particular segment of a program a second or third time.)

At 340, playback hash values computed at 338 for the content item may be stored in memory. The set of playback sums may be only a partial set of hash values for the content item (if, for example, only a portion of content item was actually played back.) In some embodiments, the set of playback hash values is associated in memory with a content ID sent to the playback system with the encrypted content file. The set of playback sums is reported to the measurement system at 342 and received by the measurement system at 350. In some embodiments, the content ID for the content item is sent to the measurement system with the set of playback hash values. In certain embodiments, the received playback sums and/or content ID are stored in the measurement system.

At 352, the playback hash values are compared with registration hash values. The registration hash values may be the hash values that were received in the measurement system at 328 and/or stored at 330 for the content item and/or sets of hash values for other content items. In this embodiment, the same hash function was applied to compute both the registration hash values at 320 and the playback hash values at 338, for the same blocks of data of the encrypted content file. Therefore, the value of the playback hash value for each segment of the content item will match the value of the registration hash value for the segment.

At 354, the measurement system determines the segments of the content item, if any, that were played based on any matches between the playback hash values for the content item and the registration hash values for the content item. At 356, the consumption of the content item is reported. The consumption report may be provided, for example, to an advertiser, a content provider, or any other party.

In the embodiment illustrated in FIG. 4, only one content item is created, distributed, and measured for illustrative purposes. Any number of content items may however, be created, distributed, and measured in various embodiments. In various embodiments, a measurement entity may report consumption data for any number of content items, delivered by any number of content providers, to any number of users, over any period of time.

In the embodiment illustrated in FIG. 4, various aspects of the method are performed, for illustrative purposes, in the content delivery system, the playback system, or the measurement system. Any of the actions described in FIG. 4 may, however, be reallocated to a different one of the systems or performed by another system. For example, in one embodiment, a measurement system may compute registration hash values for a content item from an encrypted content file for the content item provided to the measurement system. As another example, in one embodiment, a measurement entity may perform encryption and hash value computation for a content item from an unencrypted file provided by a content provider. In addition, in certain embodiments, hash value-related functions may be implemented in client code installed on a content delivery system (such as a content server), a playback system, or both. For example, registration hash value-related functions (such as computation of registration hash values) may be performed by an encoding client installed in a content delivery system (such as encoding component 258 described above relative to FIG. 3). Similarly, playback hash value-related functions (such as computation of playback hash values) may be performed in a measurement client installed in a playback system (such as measurement component 260 described above relative to FIG. 3). In some embodiments, a measurement entity may provide or specify the client code to be installed at systems operated by other entities.

In certain embodiments, a separate content ID may be established for each block of data of an encrypted file and/or each segment of a content item. In some embodiments, content IDs for each block of data may be sent with the encrypted content file (for example, in metadata associated with each block of data). In some embodiments, the content ID for each block of data may be associated and/or stored with a hash value corresponding to the block of data. In various embodiments, a measurement system or a playback system may use block-level content IDs to identify segments of content played (for example, to identify the registration hash value that is to be matched against a playback hash value).

Figure 5:
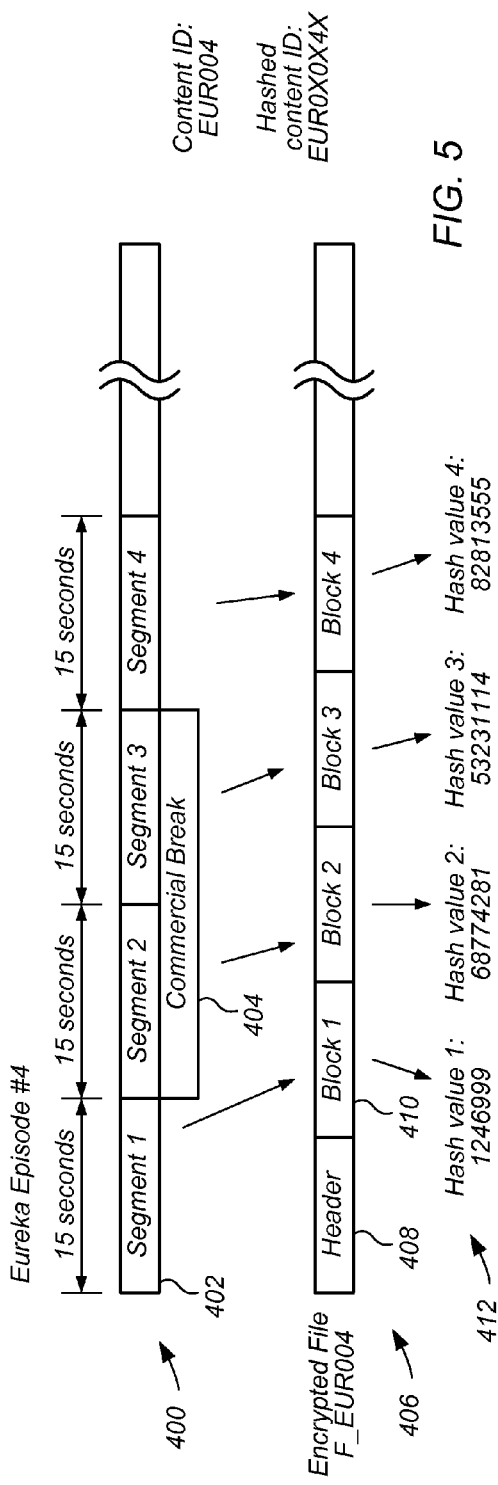
FIGS. 5 and 6 illustrates example of generating hash values from blocks of data of an encrypted file in which the blocks of data correspond to segments of a content item.
Figure 6:
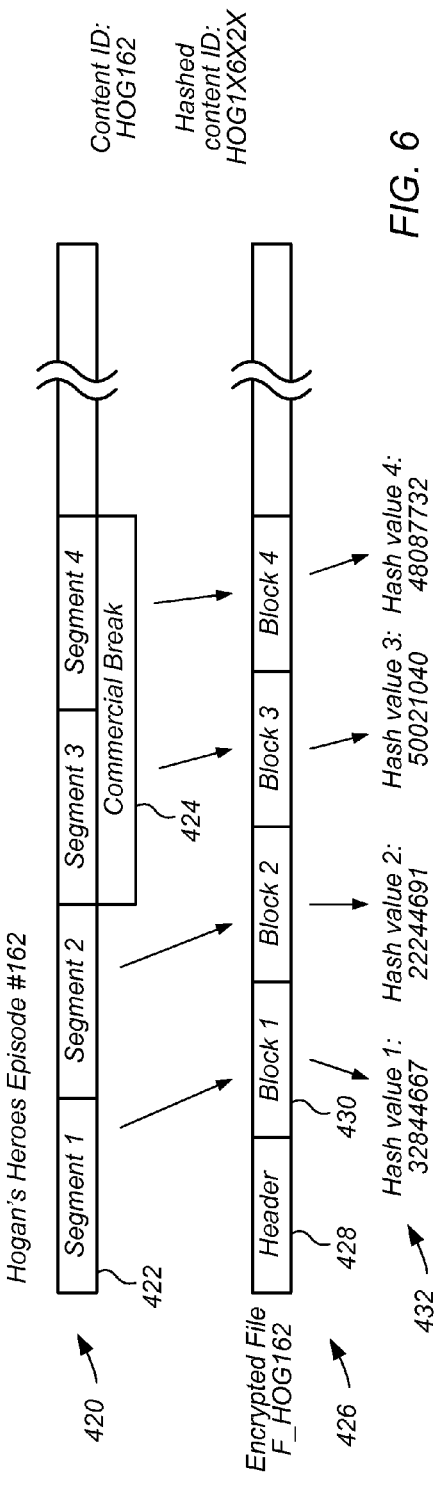
Figure 7:
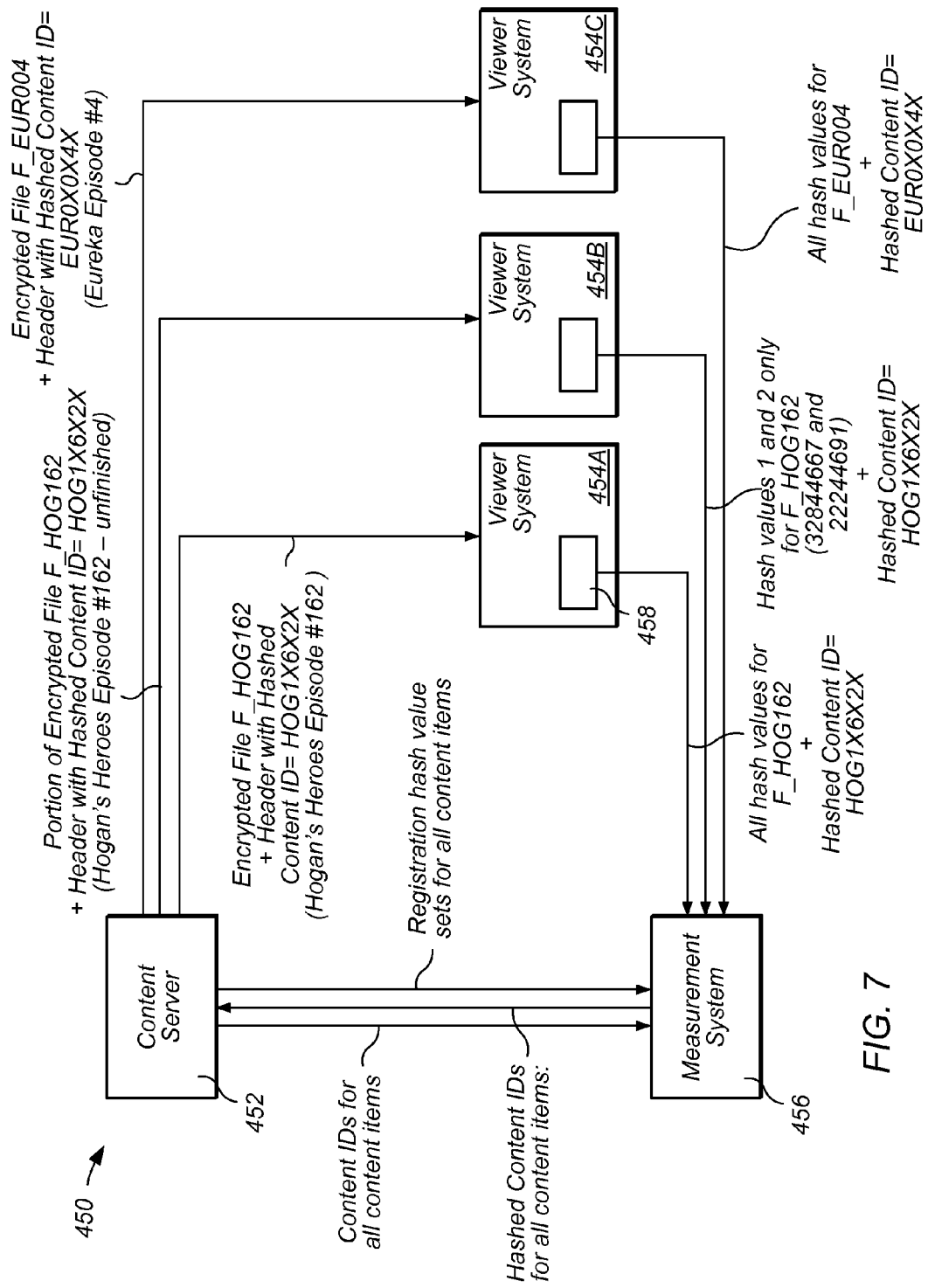
FIG. 7 illustrates an example of using the hash values generated in FIGS. 5 and 6 to measure consumption of content.

FIGS. 5 and 6 illustrates example of generating hash values from blocks of data of an encrypted file in which the blocks of data correspond to segments of a content item. FIG. 7 illustrates an example of using the hash values generated in FIGS. 5 and 6 to measure consumption of content. In FIG. 5, content item 400 is Episode #4 of television program Eureka. Content item 400 includes segments 402 (Segments 1, 2, 3, and 4). Segments 1 and 4 may correspond to segments of content item 400 (a portion of Episode #4). Segments 2 and 3 may correspond to commercial break 404 in Episode #4. In one embodiment, each segment is a 15 second interval. A segment may, however, be any length of time. The lengths of segments within a content item may vary from segment to segment. Encrypted content file 406 includes header 408 and data blocks 410 (block 1, 2, 3, and 4). Although only four blocks are shown in FIG. 5 for illustrative purposes, a content item may include any number of blocks of data. In one embodiment, a content item is a single block of data corresponding to a single segment of content.

Hash values 412 may be computed from data blocks 410. Hash values 412 may be determined using any suitable function.

In FIG. 6, content item 420 is Episode #162 of television program Hogan's Heroes. Content item includes segments 422 (Segments 1, 2, 3, and 4). Segments 1 and 2 may correspond to a portion of content item 420 (a portion of Episode #4). Segments 3 and 4 may correspond to commercial break 424 in Episode #4. Encrypted content file 426 includes header 428 and data blocks 430 (block 1, 2, 3, and 4). Hash values 432 may be computed from data blocks 430. Hash values 432 may be determined using any suitable function.

Although in the examples illustrated in FIGS. 5 and 6, the beginning and end of commercial breaks 404 and 424 align with breaks between segments, in various embodiments, the beginning and end of a segment may have any relationship or no relationship with a commercial break, or with any other aspects of the content.

In FIG. 7, system 450 includes content server 452, viewer systems 454A, 454B, and 454C, and measurement system 456. Each of viewer systems 454A, 454B, and 454C include measurement component 458. Measurement components 458 may interact with measurement system 456 to collect data concerning consumption of content by viewer systems 454A, 454B, and 454C.

Content server 452 may assign content IDs for all content items being distributed from content server 452. Content server 452 may send content IDs to measurement system 456 and receive in return cryptographically hashed content IDs.

Content server 452 may compute sets of registration hash values for any or all of the content items on content server 452 and provide the sets of hash values to measurement system 456.

In the example illustrated in FIG. 7, consumers at each of viewer systems 454A and 454B may request Episode #162 of Hogan's Heroes. A consumer at viewer system 454C may request Episode #4 of Eureka. Content server 452 may serve encrypted content file F_HOG162 to viewer systems 454A and 454B. The header of encrypted content file F_HOG162 may include hashed content ID HOG1X6X2X. Content server 452 may serve encrypted content file F_EUR004 to viewer system 454C. The header of encrypted content file F_EUR004 may include hashed content ID EUR0X0X4X.

Measurement components 458 may compute sets of playback hash values for content actually played on viewer systems 454A, 454B, and 454C. Measurement components 458 may report the sets of playback hash values to measurement system 456. For viewer system 454A, all of the hash values for F_HOG162 are sent to measurement system 456, indicating that the entire episode of Hogan Heroes was played back. Similarly, for viewer system 454C, all of the hash values for F_EUR004 are sent to measurement system 456 as playback hash values, indicating that the entire episode of Eureka was played back. For viewer system 454B, however, only the first two hash values, hash values 1 and 2 (32844667 and 22244691) were computed and sent to measurement system 456. Hash values 1 and 2 correspond to the first two 15-second segments of the episode. Neither hash values 3 and 4 nor any other hash values were sent to measurement system 456 from viewer system 454B. From this information, measurement system 456 may determine that the consumer at 454B tuned out at segment 3 (which corresponds to the beginning of commercial break 424 shown in FIG. 6).

The methods that are possible and contemplated under the scope of the system and method for measurement of content consumption are not limited to the examples described above. In some cases, elements may be added or removed from the methods while remaining within the spirit and scope of the system and method for digital rights management with a lightweight digital watermarking component. In various embodiments, any of the functionality described above with respect to the components of FIG. 1 may be implemented as elements of a computer-implemented method, such as the methods of FIG. 4.

Example Computer System

Various embodiments of a system and method for digital rights management with a lightweight digital watermarking component, as described herein, may be executed on one or more computer systems, which may interact with various other devices. One such computer system is computer system 700 illustrated FIG. 8, which may in various embodiments implement any of the elements illustrated in FIGS. 1-7. Computer system 700 may be capable of implementing the functionality of a client system or a distribution system (such as those described above with respect to FIG. 1) which may be stored in memory as processor-executable program instructions. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. While not presented according to the level of detail as computer system 700 (which may implement the functionality of client system 140 in some embodiments), the functionality of distribution system 120 may also be implemented via a computer system, such as computer system 700.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x66, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, data 732 may include any of the data described above including but not limited to protected content 108, content license 125, content 102, and watermarked content 170. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework (as described above), may be stored within system memory 720. For instance, program instructions 722 may be executable to implement DRM component 162 and watermarking component 164. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 400), such as other computer systems (e.g., distribution system 120), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 600. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the method illustrated by FIG. 4. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g.

SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method of providing registration information for measuring consumption of media content, comprising:

performing, by one or more computing devices:

computing, for at least one encrypted content file representing one or more content items, a set of registration hash values, wherein at least one of the registration hash values in the set is computed by applying a hash function to a block of data of the encrypted content file, wherein the block of data corresponds to a segment of at least one of the content items;

providing to a measurement entity at least one set of registration hash values associated the one or more content items;

sending to the measurement entity a content ID corresponding to the content item corresponding to at least one set of registration hash values;

receiving a cryptographically hashed version of the content ID from the measurement entity, wherein the content ID is cryptographically hashed; and delivering at least one encrypted content file representing at least one of the one or more content items to one or more content viewer systems;

wherein one or more of the registration hash values provided to the measurement entity can be used in measuring consumption of the content items delivered to at least one of the content viewer systems;

wherein the cryptographically hashed version of the content ID for the content item is configured to identify the content item being at least partially played back in the at least one content viewer system.

2. The method of claim 1, further comprising encrypting at least one file to generate the at least one encrypted content file representing the one or more content items.

3. The method of claim 1, wherein, for at least one content item, computing the set of registration hash values for the at least one encrypted content file comprises computing registration hash values for two or more blocks of data of the encrypted content file, wherein each of the blocks of data corresponds to a different segment of the content item.

4. The method of claim 1, further comprising:
assigning a content ID to at least one of the one or more content items; and
associating the content ID for the at least one content item with a corresponding set of registration hash values for the content item.

5. The method of claim 4, further comprising sending the assigned content ID as metadata with the encrypted content file for the at least one content item delivered to the one or more content viewer systems.

6. The method of claim 4, further comprising sending the assigned content ID for the at least one content item to the measurement system in association with one or more playback hash values computed for the content item.

7. The method of claim 4, wherein assigning a content ID to at least one of the one or more content items comprises:
sending a content ID for at least one content item corresponding to at least one set of registration hash values to a measurement entity; and
receiving a cryptographically hashed version of the content ID back from the measurement entity.

8. The method of claim 1, further comprising sending to the measurement entity an unencrypted content file for at least one of the content items.

9. The method of claim 1, further comprising sending to the measurement entity at least one analysis file for at least one of the content items, wherein the analysis file comprises information to relate the registration hash values with segments of the content items.

10. A computer-implemented method of providing playback information for measuring consumption of media content, comprising:
performing, by one or more computing devices:
receiving in a content viewer system at least one encrypted content file from a content provider, wherein the encrypted content file represents one or more content items;
receiving a cryptographically hashed version of a content ID associated with at least one of the content items, wherein the content ID is cryptographically hashed;
computing, for the at least one encrypted content file received from the content provider, a set of playback hash values, wherein at least one of the playback hash values is computed by applying the hash function to a block of data of the encrypted content file that corresponds to a segment of a content item actually played on the content viewer system; and
reporting one or more of the playback hash values to a measurement entity,
wherein one or more of the playback hash values reported to the measurement entity can be matched with one or more registration hash values computed prior to content distribution and provided to the measurement entity to establish which segments of a content item associated with the matched hash values has been played,
wherein the cryptographically hashed version of the content ID for the content item is configured to identify the content item being at least partially played back in the content viewer system.

11. The method of claim 10, wherein, for at least one content item, computing the set of playback hash values for the at least one encrypted content file comprises computing playback hash values for two or more blocks of data of the encrypted content file, wherein each of the blocks of data corresponds to a different segment of the content item.

12. The method of claim 10, wherein at least one of the content items is delivered to the content viewer system with a content ID for the content item, the method further comprising:
associating the content ID for the content item with a set of playback hash values computed for at least one segment of the content item; and
sending the content ID to the measurement entity in association with the set of playback values computed for the at least one segment.

13. The method of claim 12, wherein the content ID is included in a metadata header of an encrypted content file for the content item when the content item is delivered the viewer/consumer.

14. The method of claim 10, further comprising receiving, with at least one of the encrypted content files received from the content provider, a measurement flag associated with the encrypted content file, wherein computation of the playback hash values for the content item is triggered by detection of the measurement flag.

15. The method of claim 10, further comprising:
decrypting at least a portion of at least one encrypted content file received from the content provider; and
playing at least a portion of the content item on the content viewer system.

16. A computer-implemented method of measuring consumption of media content, comprising:
performing, by one or more computing devices:
receiving one or more sets of registration hash values, wherein each of at least one of the sets of registration hash values corresponds to a content item, and wherein, for at least one of the sets of registration hash values, each of at least one of the registration hash values in the set is computed by applying a hash function to a portion of an encrypted content file representing the content item;
receiving a content ID corresponding to the content item corresponding to at least one set of registration hash values; and
generating a cryptographically hashed version of the content ID, wherein the content ID is cryptographically hashed; and
sending the cryptographically hashed version of the content ID to a content provider for the content item;
receiving one or more sets of playback hash values, wherein each of at least one of the sets of playback hash values corresponds to at least a portion of a content item actually played on a content viewer system, wherein, for at least one of the sets of playback hash values, each of at least one of the playback hash values in the set is computed by applying the hash function to a portion of an encrypted content file delivered to the content viewer system;
receiving the cryptographically hashed version of the content ID when the content item associated with the content ID is played back;
determining one or more matches between at least one of the received playback hash values computed from the encrypted content file delivered to the content viewer system and at least one of the registration hash values;
determining at least one segment of the content item has been played on the content viewer system based on at least one of the matches between the at least one registration hash value and the at least one playback hash value; and using the received cryptographically hashed version of the content ID for the content item to identify the content item being at least partially played back in the content viewer system.

17. The method of claim 16, wherein, for at least one of the sets of registration hash values, each of at least one of the registration hash values in the set is computed by applying a hash function to a block of data of an encrypted content file for the content item, wherein the block of data of the encrypted content file corresponds to a segment of the content item, and wherein, for at least one of the sets of playback hash values, each of at least one of the playback hash values in the set is computed by applying the hash function to a block of data of an encrypted content file delivered to the content viewer system that corresponds to a segment of the content item.

18. The method of claim 16, further comprising using the received content ID to identify a set of registration hash values to be matched with the playback hash values computed for the content item.

19. The method of claim 16, wherein the cryptographically hashed version of the content ID is included in a metadata header of an encrypted content file for the content item when the content item is delivered the content viewer system.

20. The method of claim 16, further comprising:

receiving at least one encrypted content file for at least one of content item, wherein at least one of the sets of received registration hash values is computed from the at least one received encrypted content file.

21. The method of claim 16, further comprising:

receiving at least one unencrypted content file representing at least one content item;

encrypting at least a portion of the unencrypted content file to produce at least one encrypted content file; and wherein at least one of the sets of received registration hash values is computed from the at least one encrypted content file.

22. The method of claim 16, further comprising receiving at least one analysis file for at least one content item, wherein the analysis file comprises information for relating the registration hash values with associated segments of the at least one content item.

23. The method of claim 16, wherein at least one of the registration hash values or at least one of the playback hash values is received over a network.

\* \* \* \* \*

UNITED STATES PATENT AND TRADEMARK OFFICE
CERTIFICATE OF CORRECTION

PATENT NO. : 8,417,966 B1
APPLICATION NO. : 12/796553
DATED : April 9, 2013
INVENTOR(S) : Mark Randall Mooneyham Page 1 of 1

It is certified that error appears in the above-identified patent and that said Letters Patent is hereby corrected as shown below:

In the Claims

Column 20, Line 42, Claim 1, insert -- with -- between "...values associated" and "the one or...", therefor.

Column 22, Line 15, Claim 13, insert -- to -- between "...is delivered" and "the...", therefor.

Column 23, Line 24, Claim 19, insert -- to -- between "...is delivered" and "the content...", therefor.

Signed and Sealed this
Twelfth Day of November, 2013

Teresa Stanek Rea
*Deputy Director of the United States Patent and Trademark Office*